United States Patent
Diehl et al.

(10) Patent No.: US 10,344,155 B2
(45) Date of Patent: Jul. 9, 2019

(54) HEAT-RESISTANT POLYOLEFIN COMPOSITIONS SUITABLE FOR FILMS

(71) Applicant: Dow Global Technologies LLC, Midland, MI (US)

(72) Inventors: Charles F. Diehl, Durango, CO (US); Andy C. Chang, Houston, TX (US); Ashish Batra, Indianapolis, IN (US); Suzanne M. Guerra, Lake Jackson, TX (US); Jill M. Martin, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/678,289

(22) Filed: Aug. 16, 2017

(65) Prior Publication Data

US 2017/0342251 A1 Nov. 30, 2017

Related U.S. Application Data

(63) Continuation of application No. 14/406,966, filed as application No. PCT/US2013/057342 on Aug. 29, 2013.

(60) Provisional application No. 61/695,652, filed on Aug. 31, 2012.

(51) Int. Cl.
| | | |
|---|---|---|
| *C08L 23/00* | (2006.01) | |
| *C08L 23/16* | (2006.01) | |
| *C08L 23/08* | (2006.01) | |
| *C08K 5/00* | (2006.01) | |
| *C08K 3/20* | (2006.01) | |
| *C08L 23/14* | (2006.01) | |
| *C08L 51/06* | (2006.01) | |
| *C08K 3/013* | (2018.01) | |

(52) U.S. Cl.
CPC .............. *C08L 23/16* (2013.01); *C08K 3/013* (2018.01); *C08K 3/20* (2013.01); *C08K 5/0008* (2013.01); *C08L 23/0815* (2013.01); *C08L 23/142* (2013.01); *C08L 51/06* (2013.01); *C08L 2201/08* (2013.01); *C08L 2203/16* (2013.01)

(58) Field of Classification Search
CPC ............................ C08L 23/16; C08L 23/0815; C08L 2201/08; C08L 2203/16; C08K 3/0033; C08K 5/0008
USPC ......................................... 524/528, 579, 570
See application file for complete search history.

(56) References Cited

U.S. PATENT DOCUMENTS

| | | |
|---|---|---|
| 4,798,081 A | 1/1989 | Hazlitt et al. |
| 5,595,827 A | 1/1997 | Yamada et al. |
| 6,497,691 B1 | 12/2002 | Bevins et al. |
| 6,667,351 B2 | 12/2003 | Langohr et al. |
| 6,803,014 B2 | 10/2004 | Ho et al. |
| 7,608,668 B2 | 10/2009 | Li Pi Shan et al. |
| 7,947,793 B2 | 5/2011 | Marchand et al. |
| 2006/0135699 A1 | 6/2006 | Li et al. |
| 2011/0008567 A1* | 1/2011 | Weeks ................... B32B 27/12 428/95 |

FOREIGN PATENT DOCUMENTS

| | | |
|---|---|---|
| EP | 0091807 A1 | 10/1983 |
| EP | 0300689 A2 | 1/1989 |
| EP | 0330272 A2 | 8/1989 |
| EP | 0634455 A1 | 1/1995 |
| EP | 0672737 A1 | 9/1995 |
| EP | 0839842 A2 | 5/1998 |
| EP | 1097976 A2 | 5/2001 |
| EP | 1127933 A2 | 8/2001 |
| EP | 1318908 A1 | 6/2003 |
| WO | 1992020534 A1 | 11/1992 |
| WO | 2000071637 A1 | 11/2000 |
| WO | 2002064674 A2 | 8/2002 |
| WO | 2004003060 A2 | 1/2004 |
| WO | 2005054361 A1 | 6/2005 |
| WO | 0590427 A2 | 9/2005 |
| WO | 2006/115839 A1 | 11/2006 |
| WO | 2009062197 A1 | 5/2009 |
| WO | 2010/008943 A2 | 1/2010 |

* cited by examiner

*Primary Examiner* — Kelechi C Egwim

(57) ABSTRACT

Compositions are provided that comprise: (1) a polymer selected from the group consisting of: (A) an ethylene/α-olefin multiblock interpolymer; (B) a propylene based plastomer or elastomer; and (C) a mixture of (A) and (B); (2) from about 1 to about 75 weight percent filler based on the weight of the composition; and (3) an effective amount of tackifier.

8 Claims, 7 Drawing Sheets

HEAT-RESISTANT POLYOLEFIN COMPOSITIONS SUITABLE FOR FILMS

FIELD OF THE INVENTION

This invention relates to improved polyolefin compositions which are heat-resistant and often suitable for films.

BACKGROUND

Polyvinyl chloride (PVC) is a widely used thermoplastic polymer. It is often used in applications requiring a conformable and/or flame resistant formulation. Such applications include tapes suitable for, for example, signage, drapes, and bandages. Unfortunately, PVC-based formulations often result in fogging and release HCl when they burn. The released HCl fumes and the breakdown of the HCl fumes may pose a health hazard. Furthermore, to achieve soft conformable characteristics of flexible polyvinyl chloride (f-PVC), current practice is to formulate with phthalates which are associated with potential health risks. In addition, it is also unfortunate that polyvinyl chloride production typically requires a vinyl chloride starting material. The vinyl chloride production, as well as incineration of waste PVC may create harmful dioxins. Accordingly, compositions are needed that have characteristics of PVC-based formulations yet lack PVC and its inherent disadvantages.

SUMMARY OF THE INVENTION

Advantageously, compositions have been discovered that are capable of replacing PVC-based formulations and are often suitable for, for example, films. In one embodiment, the inventive compositions comprise: (1) a polymer selected from the group consisting of: (A) an ethylene/α-olefin multiblock interpolymer; (B) a propylene based plastomer or elastomer; and (C) a mixture of (A) and (B); (2) from about 1 to about 75 weight percent filler based on the weight of the composition; and (3) an effective amount of tackifier. In another embodiment the ethylene/α-olefin multiblock interpolymers are characterized before any crosslinking by one or more of the following characteristics:

(1) an average block index greater than zero and up to about 1.0 and a molecular weight distribution, Mw/Mn, greater than about 1.3; or (2) at least one molecular fraction which elutes between 40° C. and 130° C. when fractionated using TREF, characterized in that the fraction has a block index of at least 0.5 and up to about 1; or (3) an Mw/Mn from about 1.7 to about 3.5, at least one melting point, Tm, in degrees Celsius, and a density, d, in grams/cubic centimeter, wherein the numerical values of Tm and d correspond to the relationship:

$T_m > -6553.3 + 13735(d) - 7051.7(d)^2$; or (4) an Mw/Mn from about 1.7 to about 3.5, and a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$\Delta T \geq -0.1299(\Delta H) + 62.81$ for $\Delta H$ greater than zero and up to 130 J/g, $\Delta T \geq 48°$ C. for $\Delta H$ greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.; or (5) an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$Re > 1481 - 1629(d)$; or (6) has a molecular fraction which elutes between 40° C. and 130° C. when fractionated using TREF, characterized in that the fraction has a molar comonomer content greater than, or equal to, the quantity (−0.2013) T+20.07, more preferably greater than or equal to the quantity (−0.2013) T+21.07, where T is the numerical value of the peak elution temperature of the TREF fraction, measured in ° C.; or (7) a storage modulus at 25° C., G' (25° C.), and a storage modulus at 100° C., G' (100° C.), wherein the ratio of G'(25° C.) to G' (100° C.) is in the range of about 1:1 to about 9:1.

The ethylene/α-olefin multiblock interpolymer characteristics (1) through (7) above are given with respect to the ethylene/α-olefin interpolymer before any significant crosslinking, i.e., before crosslinking. The ethylene/α-olefin interpolymers useful in the present invention may or may not be crosslinked depending upon the desired properties. By using characteristics (1) through (7) as measured before crosslinking is not meant to suggest that the interpolymer is required or not required to be crosslinked—only that the characteristic is measured with respect to the interpolymer without significant crosslinking. Crosslinking may or may not change each of these properties depending upon the specific polymer and degree of crosslinking.

DETAILED DESCRIPTION OF THE INVENTION

Figure 1:
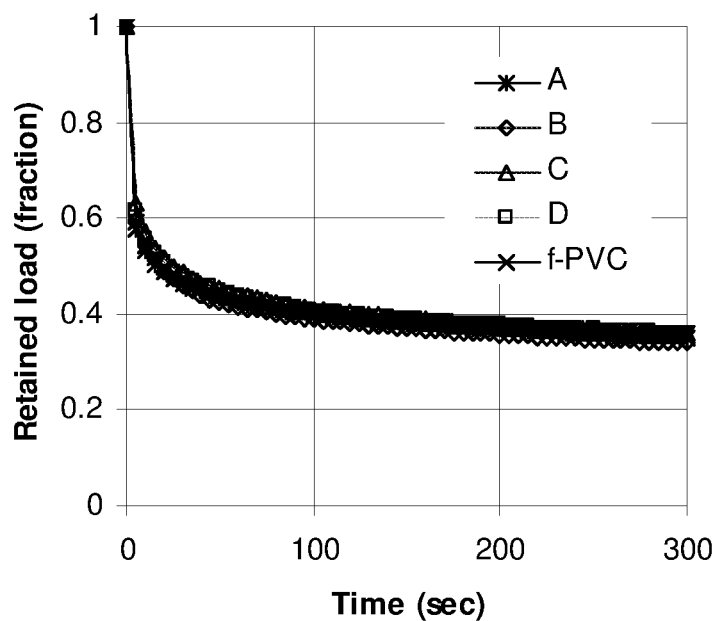
FIG. 1 shows retained load (fraction) over 5 minutes on applying 100% strain for control f-PVC and formulations A-D tapes of Example 1.

"Polymer" means a polymeric compound prepared by polymerizing monomers, whether of the same or a different type. The generic term "polymer" embraces the terms "homopolymer," "copolymer," "terpolymer" as well as "interpolymer."

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

"Composition," as used herein, includes a mixture of materials which comprise the composition, as well as reaction products and decomposition products formed from the ingredients or materials of the composition. Specifically included within the compositions of the present invention are grafted or coupled compositions wherein an initiator or coupling agent reacts with at least a portion of one or more polymers and/or at least a portion of one or more fillers.

The compositions of the present invention typically comprise (1) a polymer selected from the group consisting of: (A) an olefin block copolymer; (B) a propylene based plastomer or elastomer; and (C) a mixture of (A) and (B); (2) from about 0, preferably from about 1 weight percent to about 75 weight percent filler based on the weight of the composition; and (3) an effective amount of tackifier.

The term "olefin block copolymer" or "OBC" means an ethylene/α-olefin multi-block copolymer and includes ethylene and one or more copolymerizable α-olefin comonomer in polymerized form, characterized by multiple blocks or segments of two or more polymerized monomer units differing in chemical or physical properties. The terms "interpolymer" and "copolymer" are used interchangeably herein. When referring to amounts of "ethylene" or "comonomer" in the copolymer, it is understood that this means polymerized units thereof. In some embodiments, the multi-block copolymer can be represented by the following formula:

$(AB)_n$ where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows.

AAA-AA-BBB-BB

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block. For purposes of United States patent practice, the contents of PCT Application No. PCT/US2005/008917 (Dow 63558D), filed on Mar. 17, 2005, which in turn claims priority to U.S. Provisional Application No. 60/553,906, filed Mar. 17, 2004 as well as WO 2006/115839 published on Nov. 2, 2006 are herein incorporated by reference in their entirety.

Preferably, ethylene comprises the majority mole fraction of the whole block copolymer, i.e., ethylene comprises at least 50 mole percent of the whole polymer. More preferably ethylene comprises at least 60 mole percent, at least 70 mole percent, or at least 80 mole percent, with the substantial remainder of the whole polymer comprising at least one other comonomer that is preferably an α-olefin having 3 or more carbon atoms. In some embodiments, the olefin block copolymer may comprise 50 mol % to 90 mol % ethylene, preferably 60 mol % to 85 mol %, more preferably 65 mol % to 80 mol %. For many ethylene/octene block copolymers, the preferred composition comprises an ethylene content greater than 80 mole percent of the whole polymer and an octene content of from 10 to 15, preferably from 15 to 20 mole percent of the whole polymer.

The olefin block copolymer includes various amounts of "hard" and "soft" segments. "Hard" segments are blocks of polymerized units in which ethylene is present in an amount greater than 95 weight percent, or greater than 98 weight percent based on the weight of the polymer, up to 100 weight percent. In other words, the comonomer content (content of monomers other than ethylene) in the hard segments is less than 5 weight percent, or less than 2 weight percent based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 weight percent, or greater than 8 weight percent, greater than 10 weight percent, or greater than 15 weight percent based on the weight of the polymer. In some embodiments, the comonomer content in the soft segments can be greater than 20 weight percent, greater than 25 weight percent, greater than 30 weight percent, greater than 35 weight percent, greater than 40 weight percent, greater than 45 weight percent, greater than 50 weight percent, or greater than 60 weight percent and can be up to 100 weight percent.

The soft segments can be present in an OBC from 1 weight percent to 99 weight percent of the total weight of the OBC, or from 5 weight percent to 95 weight percent, from 10 weight percent to 90 weight percent, from 15 weight percent to 85 weight percent, from 20 weight percent to 80 weight percent, from 25 weight percent to 75 weight percent, from 30 weight percent to 70 weight percent, from 35 weight percent to 65 weight percent, from 40 weight percent to 60 weight percent, or from 45 weight percent to 55 weight percent of the total weight of the OBC. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/α-Olefin Block Inter-polymers," filed on Mar. 15, 2006, in the name of Colin L. P. Shan, Lonnie Hazlitt, et. al. and assigned to Dow Global Technologies Inc., the disclosure of which is incorporated by reference herein in its entirety. In particular, hard and soft segment weight percentages and comonomer content may be determined as described in Column 57 to Column 63 of U.S. Pat. No. 7,608,668.

The olefin block copolymer is a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present OBC is characterized by unique distributions of both polymer polydispersity (PDI or Mw/Mn or MWD), block length distribution, and/or block number distribution, due, in an embodiment, to the effect of the shuttling agent(s) in combination with multiple catalysts used in their preparation.

In an embodiment, the OBC is produced in a continuous process and possesses a polydispersity index, PDI, from 1.7 to 3.5, or from 1.8 to 3, or from 1.8 to 2.5, or from 1.8 to 2.2. When produced in a batch or semi-batch process, the OBC possesses PDI from 1.0 to 3.5, or from 1.3 to 3, or from 1.4 to 2.5, or from 1.4 to 2.

In addition, the olefin block copolymer possesses a PDI fitting a Schultz-Flory distribution rather than a Poisson distribution. The present OBC has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present olefin block copolymer possesses a most probable distribution of block lengths. In an embodiment, the olefin block copolymer is defined as having:

(A) Mw/Mn from 1.7 to 3.5, at least one melting point, Tm, in degrees Celsius, and a density, d, in grams/cubic centimeter, where in the numerical values of Tm and d correspond to the relationship:

$$Tm > -2002.9 + 4538.5(d) - 2422.2(d)^2, \text{ and/or}$$

(B) Mw/Mn from 1.7 to 3.5, and is characterized by a heat of fusion, $\Delta H$ in J/g, and a delta quantity, $\Delta T$, in degrees Celsius defined as the temperature difference between the tallest DSC peak and the tallest Crystallization Analysis Fractionation ("CRYSTAF") peak, wherein the numerical values of $\Delta T$ and $\Delta H$ have the following relationships:

$$\Delta T > -0.1299 \Delta H + 62.81 \text{ for } \Delta H \text{ greater than zero and up to 130 J/g}$$

$$\Delta T \geq 48° \text{ C. for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d); \text{ and/or}$$

(D) has a molecular fraction which elutes between 40° C. and 130° C. when fractionated using TREF, characterized in that the fraction has a molar comonomer content greater than, or equal to, the quantity (−0.2013) T+20.07, more preferably greater than or equal to the quantity (−0.2013) T+21.07, where T is the numerical value of the peak elution temperature of the TREF fraction, measured in ° C.; and/or, (E) has a storage modulus at 25° C., G' (25° C.), and a storage modulus at 100° C., G' (100° C.), wherein the ratio of G' (25° C.) to G' (100° C.) is in the range of 1:1 to 9:1.

The olefin block copolymer may also have:

(F) a molecular fraction which elutes between 40° C. and 130° C. when fractionated using TREF, characterized in that the fraction has a block index of at least 0.5 and up to 1 and a molecular weight distribution, Mw/Mn, greater than 1.3; and/or (G) average block index greater than zero and up to 1.0 and a molecular weight distribution, Mw/Mn greater than 1.3. It is understood that the olefin block copolymer may have one, some, all, or any combination of properties (A)-(G). Block Index can be determined as described in detail in U.S. Pat. No. 7,608,668 herein incorporated by reference for that purpose. Analytical methods for determining properties (A) through (G) are disclosed in, for example, U.S. Pat. No. 7,608,668, Col. 31, line 26 through Col. 35, line 44, which is herein incorporated by reference for that purpose.

Suitable monomers for use in preparing the present OBC include ethylene and one or more addition polymerizable monomers other than ethylene. Examples of suitable comonomers include straight-chain or branched α-olefins of 3 to 30, preferably 3 to 20, carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, preferably 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

The olefin block copolymer has a density of from 0.820 g/cc to 0.925 g/cc, or from 0.860 g/cc to 0.88 g/cc or from 0.860 g/cc to 0.879 g/cc. The OBC has a Shore A value of 40 to 70, preferably from 45 to 65 and more preferably from 50 to 65. In some embodiments, the olefin block copolymer has a melt index (MI) from 0.1 g/10 min to 30 g/10, or from 0.1 g/10 min to 20 g/10 min, or from 0.1 g/10 min to 15 g/10 min, as measured by ASTM D 1238 (190° C./2.16 kg). The olefin block copolymer is present in an amount of 5 wt % to 45 wt %, preferably 10 wt % to 30 wt %, more preferably 10 wt % to 25 wt %. The composition may comprise more than one olefin block copolymer.

The olefin block copolymers can be produced via a chain shuttling process such as described in U.S. Pat. No. 7,858,706, which is herein incorporated by reference. In particular, suitable chain shuttling agents and related information are listed in Col. 16, line 39 through Col. 19, line 44. Suitable catalysts are described in Col. 19, line 45 through Col. 46, line 19 and suitable co-catalysts in Col. 46, line 20 through Col. 51 line 28. The process is described throughout the document, but particularly in Col. Col 51, line 29 through Col. 54, line 56. The process is also described, for example, in the following: U.S. Pat. Nos. 7,608,668; 7,893,166; and U.S. Pat. No. 7,947,793.

The olefin block copolymer may be a reaction product of ethylene/α-olefin interpolymer and any suitable cross-linking agent, i.e., a cross-linked ethylene/α-olefin interpolymer. Thus, cross-linking agents may be chemical compounds but are not necessarily so. Cross-linking agents as used herein also include electron-beam irradiation, beta irradiation, gamma irradiation, corona irradiation, silanes, peroxides, allyl compounds and UV radiation with or without cross-linking catalyst. U.S. Pat. Nos. 6,803,014 and 6,667,351 disclose electron-beam irradiation methods that can be used in embodiments of the invention. In some embodiments, the percent of cross-linked polymer is at least 10 percent, preferably at least about 20 percent, more preferably at least about 25 percent up to about 75 percent, preferably up to about 50 percent, as measured by the weight percent of gels formed. Typically, as the amount of crosslinking increases, the ignition resistance of the composition increases.

The terms "propylene-ethylene interpolymer", "propylene-based polymer" or "propylene based plastomers or elastomers (PBPE)" generally refer to copolymers comprising propylene and a monomer such as ethylene. Preferably, propylene comprises the majority mole fraction of the whole polymer, i.e., propylene comprises at least about 70, preferably at least about 80, more preferably at least about 90 mole percent of the whole polymer with a substantial remainder of the whole polymer comprising at least one other comonomer that is preferably ethylene. Suitable propylene-ethylene interpolymers are described in, for example, WO 2006/115839 published on Nov. 2, 2006 and incorporated herein by reference. Suitable propylene-ethylene interpolymers are sold commercially by The Dow Chemical Company as VERSIFY™, by Exxon as VISTAMAXX™, LICOCENE™ polymers (Clariant), EASTOFLEX™ polymers (Eastman Chemical Co.), REXTAC™ polymers (Hunstman), and VESTOPLAST™ polymers (Degussa). Other suitable polymers include propylene-α-olefins block copolymers and interpolymers, and other propylene based block copolymers and interpolymers known in the art.

Preferably, the propylene-based polymer has a melt flow rate (MFR) in the range of 0.01 to 2000 g/10 min, more preferably in range of 0.1 to 1000 g/10 min, and more preferably 0.5 to 500 g/10 min, and even more preferably 1 to 100 g/10 min, as measured in accordance with ASTM D 1238 at 230° C./2.16 kg.

In another embodiment, the propylene-based polymer has a melt flow rate (MFR) in the range of 0.01 to 300 grams/10 minutes, more preferably in range of 0.1 to 200 grams/10 minutes, more preferably from 0.5 to 100 grams/10 min, or from 1 to 50 grams/10 min, as measured in accordance with ASTM D 1238 at 230° C./2.16 kg. All individual values and subranges from 0.01 to 300 grams/10 min are included herein and disclosed herein.

The propylene-based polymer used in the present invention may be of any molecular weight distribution (MWD). Propylene-based polymers of broad or narrow MWD are formed by means within the skill in the art. Propylene-based polymers having a narrow MWD can be advantageously provided by visbreaking or by manufacturing reactor grades (non visbroken) using single-site catalysis, or by both methods.

The propylene-based polymer can be reactor-grade, visbroken, branched or coupled to provide increased nucleation and crystallization rates. The term "coupled" is used herein to refer to propylene-based polymers which are rheology-modified, such that they exhibit a change in the resistance of the molten polymer to flow during extrusion (for example, in the extruder immediately prior to the annular die). Whereas "visbroken" is in the direction of chain-scission, "coupled" is in the direction of crosslinking or networking. As an example of coupling, a coupling agent (for example, an azide compound) is added to a relatively high melt flow rate polypropylene polymer, such that after extrusion, the resultant polypropylene polymer composition attains a substantially lower melt flow rate than the initial melt flow rate. Preferably, for coupled or branched polypropylene, the ratio of subsequent MFR to initial MFR is less than, or equal, to 0.7:1, more preferably less than or equal to 0.2:1.

Suitable branched propylene-based polymers for use in the present invention are commercially available, for instance from Basell, under the trade designations Profax PF-611 and PF-814. Alternatively, suitable branched or coupled propylene-based polymers can be prepared by means, within the skill in the art, such as by peroxide or electron-beam treatment, for instance as disclosed by DeNicola et al., in U.S. Pat. No. 5,414,027 (the use of high energy (ionizing) radiation in a reduced oxygen atmosphere); EP 0 190 889 to Himont (electron beam irradiation of isotactic polypropylene at lower temperatures); U.S. Pat. No. 5,464,907 (Akzo Nobel NV); EP 0 754 711 Solvay (peroxide treatment); and U.S. patent application Ser. No. 09/133,576, filed Aug. 13, 1998 (azide coupling agents). Each of these patents/applications is incorporated herein by reference.

Usually, the mixture and amount of components in the inventive compositions is such that the composition has an appropriate Tg, as measured by DSC, and appropriate density for the desired application. For applications such as signage, table cloths, drapes, medical or surgical drapes, bandages, wound dressings, etc. a typical Tg, as measured by DSC, is from about −10° C. to about 50° C. and preferably from about 0° C. to about 40° C. Similarly, the density should be appropriate for the desired application. For the aforementioned applications an appropriate density of the composition is often from about 0.5 g/cm$^3$ to about 5 g/cm$^3$, preferably from about 0.75 g/cm$^3$ to about 3 g/cm$^3$, more preferably from about 1 g/cm$^3$ to about 2 g/cm$^3$. The polymers, tackifiers, and fillers may be mixed in any convenient manner but are typically compounded in, for example, a Banbury mixer or twin screw extruder. Alternatively, the components could be mixed using a solvent suitable for dissolving the polymer and tackifier components. Combination with fillers prior to removal of solvent would produce the composition of invention as well.

The amount of polymer or mixture of polymers varies depending upon the type of polymer, desired application, properties, and other components of the application. Typically, the weight ratio of tackifier to total polymer is at least about 0.1 preferably at least about 0.15, more preferably at least 0.2 to at most about 4, preferably at most about 3, more preferably at most about 2. It has been found that often affine deformation may be achieved with from about 35 weight percent to about 90 weight percent, more preferably from about 40 to about 85, and more preferably from about 40 weight percent to about 82 weight percent polymer based on the weight of the polymer and tackifier. In some embodiments, the weight ratio of olefin block copolymer (A) to propylene based polymer (B) is from about 10:1 to about 1:1. In some embodiments, the composition has a normalized retained load percentage after stress relaxation (Condition B, at ambient conditions) above about 20. In some embodiments, the composition is a thermoplastic composition with a normalized retained load percentage after stress relaxation (Condition B, ambient conditions) from about 20 to about 50 and heat resistance as measured by peak melting point of from about 40° C. to about 120° C. In some embodiments, the filler comprises from about 1 to about 90 weight percent of the composition based on the total weight of the composition. In some embodiments, the filler comprises from 40 to about 75 weight percent of the composition based on the total weight of the composition and the filler is a flame retardant filler selected from the group consisting of aluminum hydroxide, magnesium hydroxide, decabromodiphenyl oxide, tetradecabromo-diphenoxy benzene, ethane-1,2-bis(pentabromophenyl), ethylene bis-tetrabromophthalimide, and mixtures thereof.

In certain embodiments, the (A) an ethylene/α-olefin multiblock interpolymer; (B) a propylene based plastomer or elastomer; or (C) a mixture of (A) and (B) further comprises other polymers, for example, random ethylene copolymers such as AFFINITY® or ENGAGE®, traditional polyethylenes such as HDPE, LLDPE, ULDPE, LDPE and propylene-based polymers such as homopolymer PP, random copolymer PP or PP-based plastomers/elastomers or a combination thereof. The amount of such other polymers differs depending upon the elasticity desired and compatibility with the specific ethylene/α-olefin interpolymer employed.

Tackifiers of the Compositions

The tackifiers that may be useful in the present invention vary depending upon the application. However, typically they may be any tackifier that is compatible with the polymer(s) to achieve the desired properties, e.g., stress relaxation, conformability, and/or drapability, to replace PVC in a given formulation. Compatibility may be determined by routine experimentation but often useful tackifiers may exhibit one or more of the following properties: a glass transition temperature of from about 40° C. to about 95° C., a Ring and Ball Softening Point of from about 100° C. to about 160° C., or a density of from about 0.5 g/cm³ to about 1.5 g/cm³. Thus, in contrast to PVC formulations which require plasticizers to lower the composition's glass transition temperature, suitable tackifiers often raise the glass transition temperature of the instant inventive compositions. Suitable tackifiers may be selected from the group consisting of rosins, modified rosins, rosin esters, aromatic modified cycloaliphatic hydrocarbon resins, aliphatic petroleum hydrocarbon resins, partially hydrogenated aliphatic resins, terpene resins and mixtures thereof. Preferred tackifier resins are chosen from cycloaliphatic hydrocarbon resins, partially hydrogenated hydrocarbon resins, and mixtures thereof. Olefin block copolymer (OBC) compatible tackifiers often have hydrogenated rings, a Mw<2500 g/mol, low polarity, and/or low aromaticity. A Cloud point test measures the temperature at which a resin begins to precipitate from a solvent. Cloud point measurements in different solvents are used as an indicator of polarity and aromaticity and therefore as an indicator of compatibility with, for example, OBC. The Mixed Methylcyclohexane-Aniline Point Test measures aromaticity, with lower values indicating high aromatic content. The DACP (Diacetone Alcohol Cloud Point) test measures polarity. Lower values indicate more polarity. For OBC compatibility, tackifiers with DACP values between about 40° C. and about 80° C. and a MMAP value between about 70° C. and about 90° C. are often preferred.

The amount of tackifier varies depending upon the other components and desired application. Typically, as the amount of tackifier in the composition increases the tensile strength and/or elongation of the composition decreases. On the other hand, as the amount of tackifier decreases the elastic recovery increases and stress relaxation decreases. Though not intended to be limited by theory, a parameter that is known to correlate to a variety of properties is the glass transition temperature (Tg).

The scientific community has developed theories and equations that may be used to predict the relationship between glass transition temperature (Tg) and composition. For example, the well known the Fox equation below may be useful in predicting the glass transition temperature of a blend of polymers with different glass transition temperatures and can be used to predict the amount of tackifier (with a known glass transition temperature) that may be employed with a polyolefin (of a known glass transition temperature) to achieve a desired $T_g$ for the blend:

$$\frac{1}{T_g} = \frac{w_a}{T_{ga}} + \frac{w_b}{T_{gb}}$$

such that $T_g$ is the glass transition temperature of the blend; $T_{ga}$ is the glass transition temperature of component A and $w_a$ is the weight fraction of component A of the total polymer fraction in the blend; $T_{gb}$ is the glass transition temperature of component B and $w_b$ is the weight fraction of component B of the total resin fraction in the blend.

Alternatively, other equations such as the Gordon-Taylor equation may also be used. It is recognized that polymer theory for describing properties of polymers will undergo further development and refinement. It is the assertion of the authors that recognition of theories is not intended to be limiting for the novel compositions of the present invention.

Fillers of the Compositions

The type of filler and amount varies depending upon the other ingredients, amounts, and desired application. For example, if flame retardancy or high temperature performance is desired then halogenated fillers may be useful as further described below. Typically, the filler is selected from the group consisting of ammonium polyphosphate, magnesium hydroxide, calcium hydroxide, aluminum trihydrate (also referred to as aluminum trihydroxide), calcium carbonate, glass fibers, marble dust, cement dust, clay, feldspar, silica, diatomaceous earth, talc, or glass, fumed silica, silicates, alumina, magnesium oxide, antimony oxide, zinc oxide, barium sulfate, aluminum silicate, calcium silicate, titanium oxides, glass microspheres, mica, clays, wollastonite, and chalk.

Suitable flame retardant fillers are materials that inhibit or resist the spread of fire. Naturally occurring substances such as asbestos as well as synthetic materials, usually halocarbons such as polybrominated diphenyl ether (PBDEs), polychlorinated biphenyls (PCBs) and chlorendic acid derivates, most often dibutyl chlorendate and dimethyl chlorendate, have been used in this capacity. Generally, these classes of flame retardant compounds are the most common: aluminium hydroxide, magnesium hydroxide, and various hydrates; organobromines and organochlorines; phosphorus, in the form of organophosphates, halogenated phosphorus compounds, and red phosphorus; antimony trioxide; and boron compounds, mostly borates. Tetrakis (hydroxymethyl) phosphonium salts, made by passing phosphine gas through a solution of formaldehyde and a mineral acid such as hydrochloric acid, are used as flame retardants for textiles. Other flame retardants include chlorinated paraffins, polybrominated biphenyls (PBB), pentabromodiphenyl ether (pentaBDE), octabromodiphenyl ether (octaBDE), decabromodiphenyl ether (decaBDE), hexabromocyclododecane (HBCD), tri-o-cresyl phosphate, tris(2,3-dibromopropyl) phosphate (TRIS), bis(2,3-dibromopropyl) phosphate, tris(1-aziridinyl)-phosphine oxide (TEPA), and others. Particularly preferable flame retardant or high temperature resistant fillers that are often compatible with polyethylene include aluminum hydroxide, magnesium hydroxide, decabromodiphenyl oxide, tetradecabromo-diphenoxy benzene, ethane-1,2-bis(pentabromophenyl), ethylene bis-tetrabromophthalimide, and mixtures thereof available from Albemarle Corporation.

The amount of filler varies depending upon the application. Typical amounts range from about 0, preferably from 1 weight percent to about 90 weight percent, preferably from about 5 weight percent to about 80 weight percent, more preferably from about 15 weight percent to about 70 weight percent, and most preferred from about 40 to 75 weight percent filler based on the weight of the total weight of the composition. In some embodiments comprising the compositions of invention in coextruded structures, at least one surface layer comprises 1 to 75% filler, more preferably 10 to 50 wt. %, and most preferred 10 to 40 wt. %. In bicomponent fibers, at least one portion of fiber at the surface comprises 1 to 75% filler, more preferably 10 to 50 wt. %, and most preferred 10 to 40 wt. %.

Additives

Other ingredients that may be useful in the instant compositions include, for example, (1) at least one metal borate selected from the metal borates of Group IIA, and, optionally, about 0.5 to about 10 percent by weight of at least one processing aid selected from the group consisting of polydimethylsiloxane, organopolysiloxanes, tartaric acid, stearic acid, zinc stearic, waxes, and high melt flow polyolefins; (2) at least one initiator or at least one coupling agent selected from the group consisting of organic peroxides, silanes, titanates, zirconates, multifunctional vinyl compounds and organic azides; and (3) at least one hindered amine stabilizer. Yet other additives include coupling agent(s) such as those selected from the group consisting of maleic anhydride, hydroxyl amine or epoxy modified polyolefins and wetting agent(s) such as those selected from the group consisting of transition metal stearates such as zinc stearate.

Properties of Compositions

The compositions find wide use in various applications and the properties of the composition vary depending upon the application for which it was formulated. In general the compositions offer such desirable properties as stress relaxation, conformability, drapability, and/or ignition resistance. The specifics vary depending upon whether the formulation was designed for, for example, use as signage, table cloths, drapes, medical or surgical drapes, bandages, and wound dressings.

In some embodiments, compositions have one or preferably one or more of the following properties: conformability with stress-relaxation and dead-fold character and affine deformation; processability by one or more fabrication processes including cast film, blown film, or calendaring processes; ability to tear easily and cleanly by hand; and film compatibility with adhesive. In fiber or nonwoven applications, compositions usually have one or preferably one or more of the following properties: made with methods know in the art, the resulting article would have at least one of the following properties: conformability with stress-relaxation and dead-fold characteristics; processability by one or more fabrication processes including melt spun, solvent spun, staple fiber, spunbond, melt blown, or combinations thereof; ability to tear easily and cleanly by hand; and compatibility with adhesive.

Testing Methods

In the examples that follow, the following analytical techniques are employed:

Standard CRYSTAF Method

Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

DSC Standard Method

Differential Scanning calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

GPC Method

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.*, 6, 621 (1968)): $M_{polyethylene}=0.431(M_{polystyrene})$.

Polyethylene equivalent molecular weight calculations are performed using Viscotek TriSEC software Version 3.0.

Compression Set

Compression set is measured according to ASTM D 395. The sample is prepared by stacking 25.4 mm diameter round discs of 3.2 mm, 2.0 mm, and 0.25 mm thickness until a total thickness of 12.7 mm is reached. The discs are cut from 12.7 cm×12.7 cm compression molded plaques molded with a hot press under the following conditions: zero pressure for 3 min at 190° C., followed by 86 MPa for 2 min at 190° C., followed by cooling inside the press with cold running water at 86 MPa.

Density

Samples for density measurement are prepared according to ASTM D 1928. Measurements are made within one hour of sample pressing using ASTM D792, Method B.

Flexural/Secant Modulus/Storage Modulus

Samples are compression molded using ASTM D 1928. Flexural and 2 percent secant moduli are measured according to ASTM D-790. Storage modulus is measured according to ASTM D 5026-01 or equivalent technique.

Mechanical Properties—Tensile, Hysteresis, Stress-Relaxation, Dead Fold, and Tear Stress-strain behavior in uniaxial tension is measured using ASTM D 1708 microtensile specimens. Samples are stretched with an Instron at 500% min$^{-1}$ at 21° C. Tensile strength and elongation at break are reported from an average of 5 specimens.

100% and 300% Hysteresis is determined from cyclic loading to 100% and 300% strains using ASTM D 1708 microtensile specimens with an Instron™ instrument. The sample is loaded and unloaded at 267% min' for 3 cycles at 21° C. Cyclic experiments at 300% and 80° C. are conducted using an environmental chamber. In the 80° C. experiment, the sample is allowed to equilibrate for 45 minutes at the test temperature before testing. In the 21° C., 300% strain cyclic experiment, the retractive stress at 150% strain from the first unloading cycle is recorded. Percent recovery for all experiments are calculated from the first unloading cycle using the strain at which the load returned to the base line. The percent recovery is defined as:

$$\% \text{ Recovery} = \frac{\varepsilon_f - \varepsilon_s}{\varepsilon_f} \times 100$$

where $\varepsilon_f$ is the strain taken for cyclic loading and $\varepsilon_s$ is the strain where the load returns to the baseline during the 1$^{st}$ unloading cycle.

Stress relaxation is measured at 50 percent strain and 38° C. for 12 hours using an Instron™ instrument equipped with an environmental chamber. The gauge geometry is 76 mm×25 mm×0.4 mm. After equilibrating at the temperature of interest to the application (i.e. ambient, 37° C., or other) for 45 min in the environmental chamber, the sample was stretched to a target strain and rate of interest to the application (i.e. Condition A: 50% strain at 333% min$^{-1}$, Condition B: 100% strain at 500% min$^{-1}$). Stress was recorded as a function of time for the duration of the test specific to the application which is defined as the end of the test (i.e. 5 minutes, 12 hours). The percent stress relaxation was calculated using the formula:

$$\text{Stress Relaxation}(\%) = \frac{L_o - L_{end}}{L_o} \times 100$$

where $L_o$ is the load at the target strain at 0 time and $L_{end}$ is the load at the end of the test.

A simple test for dead fold property is performed by stamping a 180° fold in the film at ambient temperature and then measuring the angle to which the fold opens thereafter. The lower or smaller angles are desirable because this indicates greater dead fold retention.

Tensile notched tear experiments are carried out on samples having a density of 0.88 g/cc or less using an Instron™ instrument. The geometry consists of a gauge section of 76 mm×13 mm×0.4 mm with a 2 mm notch cut into the sample at half the specimen length. The sample is stretched at 508 mm min' at 21° C. until it breaks. The tear energy is calculated as the area under the stress-elongation curve up to strain at maximum load. An average of at least 3 specimens are reported.

TMA

Thermal Mechanical Analysis (Penetration Temperature) is conducted on 30 mm diameter×3.3 mm thick, compression molded discs, formed at 180° C. and 10 MPa molding pressure for 5 minutes and then air quenched. The instrument used is a TMA 7, brand available from Perkin-Elmer. In the test, a probe with 1.5 mm radius tip (P/N N519-0416) is applied to the surface of the sample disc with 1N force. The temperature is raised at 5° C./min from 25° C. The probe penetration distance is measured as a function of temperature. The experiment ends when the probe has penetrated 1 mm into the sample.

DMA

Dynamic Mechanical Analysis (DMA) is measured on compression molded disks formed in a hot press at 180° C. at 10 MPa pressure for 5 minutes and then water cooled in the press at 90° C./min. Testing is conducted using an ARES controlled strain rheometer (TA instruments) equipped with dual cantilever fixtures for torsion testing.

A 1.5 mm plaque is pressed and cut in a bar of dimensions 32×12 mm. The sample is clamped at both ends between fixtures separated by 10 mm (grip separation ΔL) and subjected to successive temperature steps from −100° C. to 200° C. (5° C. per step). At each temperature the torsion modulus G' is measured at an angular frequency of 10 rad/s, the strain amplitude being maintained between 0.1 percent and 4 percent to ensure that the torque is sufficient and that the measurement remains in the linear regime.

An initial static force of 10 g is maintained (auto-tension mode) to prevent slack in the sample when thermal expansion occurs. As a consequence, the grip separation ΔL increases with the temperature, particularly above the melting or softening point of the polymer sample. The test stops at the maximum temperature or when the gap between the fixtures reaches 65 mm.

Melt Index

Melt index, or $I_2$, is measured in accordance with ASTM D 1238, Condition 190° C./2.16 kg. Melt index, or $I_{10}$ is also measured in accordance with ASTM D 1238, Condition 190° C./10 kg.

ATREF

Analytical temperature rising elution fractionation (ATREF) analysis is conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

$^{13}$C NMR Analysis

The samples are prepared by adding approximately 3 g of a 50/50 mixture of tetrachloroethane-d$^2$/orthodichlorobenzene to 0.4 g sample in a 10 mm NMR tube. The samples are dissolved and homogenized by heating the tube and its contents to 150° C. The data are collected using a JEOL Eclipse™ 400 MHz spectrometer or a Varian Unity Plus™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

Polymer Fractionation by TREF

Large-scale TREF fractionation is carried by dissolving 15-20 g of polymer in 2 liters of 1,2,4-trichlorobenzene (TCB) by stirring for 4 hours at 160° C. The polymer solution is forced by 15 psig (100 kPa) nitrogen onto a 3 inch by 4 foot (7.6 cm×12 cm) steel column packed with a 60:40 (v:v) mix of 30-40 mesh (600-425 μm) spherical, technical quality glass beads (available from Potters Industries, HC 30 Box 20, Brownwood, Tex., 76801) and stainless steel, 0.028" (0.7 mm) diameter cut wire shot (available from Pellets, Inc. 63 Industrial Drive, North Tonawanda, N.Y., 14120). The column is immersed in a thermally controlled oil jacket, set initially to 160° C. The column is first cooled ballistically to 125° C., then slow cooled to 20° C. at 0.04° C. per minute and held for one hour. Fresh TCB is introduced at about 65 ml/min while the temperature is increased at 0.167° C. per minute.

Approximately 2000 ml portions of eluant from the preparative TREF column are collected in a 16 station, heated fraction collector. The polymer is concentrated in each fraction using a rotary evaporator until about 50 to 100 ml of the polymer solution remains. The concentrated solutions are allowed to stand overnight before adding excess methanol, filtering, and rinsing (approx. 300-500 ml of methanol including the final rinse). The filtration step is performed on a 3 position vacuum assisted filtering station using 5.0 μm polytetrafluoroethylene coated filter paper (available from Osmonics Inc., Cat# Z50WP04750). The filtrated fractions are dried overnight in a vacuum oven at 60° C. and weighed on an analytical balance before further testing.

Melt Strength

Melt Strength (MS) is measured by using a capillary rheometer fitted with a 2.1 mm diameter, 20:1 die with an entrance angle of approximately 45 degrees. After equilibrating the samples at 190° C. for 10 minutes, the piston is run at a speed of 1 inch/minute (2.54 cm/minute). The standard test temperature is 190° C. The sample is drawn uniaxially to a set of accelerating nips located 100 mm below the die with an acceleration of 2.4 mm/sec$^2$. The required tensile force is recorded as a function of the take-up speed of the nip rolls. The maximum tensile force attained during the test is defined as the melt strength. In the case of polymer melt exhibiting draw resonance, the tensile force before the onset of draw resonance was taken as melt strength. The melt strength is recorded in centiNewtons ("cN").

Stress-Relaxation-Recovery Behavior for Compositions at 100% Applied Strain

This test is taught in WO 1992/020534 A1 and WO2002/064674 A2 and has been used previously as a measure of conformability of films. In this test, an ASTM D1708 dog-bone micro-tensile sample is cut from the compression molded sheet or the extruded sheet. In step 1 of this test, the sample is stretched to 100% strain at the rate of 500%/min on an Instron. In step 2 it is held in place at the 100% strain for 5 minutes during which the stress relaxes. At the end of 5 minutes, in step 3 the cross-head is reversed to allow the film to retract to measure the recovery or the permanent set. The stress at a time t is normalized by the stress at the beginning of the stress-relaxation step and is plotted as a function of time over 5 minutes to monitor the fraction of retained load.

Tensile Strength and Elongation

Tensile strength and elongation at break was measured per ASTM D 1708 using an Instron 5564 fitted with a 1 kN capacity load cell and pneumatically actuated grips. A strain rate of 500%/minute was used.

25% Hysteresis Testing

Hysteresis testing was performed using ASTM D1708 micro-tensile samples. Specimens were stretched to 25% strain and returned to 0% strain for two cycles at 100%/min. Permanent set was defined as the onset of positive load during extension in the second cycle. This method has been adapted from the test method described in WO9220534A1.

Example 1—Compositions Suitable for Tapes

Formulations A-D are made by compounding the components in the amounts shown in the below table. A Banbury mixer is employed for the compounding. After compounding the formulations are extruded as tapes on a ¾" single screw Haake extruder with a 4" wide coat hanger die.

TABLE 1

Formulations A-D

|  | Density (g/cc) | Tg (° C.) | A | B | C | D |
|---|---|---|---|---|---|---|
| Escorez** 5637 | 1.1 | 78 | 32.10 | 36.40 | 37.80 | 33.30 |
| VERSIFY ™ 2200 | 0.876 | −25 | 47.1 | | | |
| VERSIFY ™ 2300 | 0.866 | −28 | | 42.8 | | |
| DE 2400.01 | 0.858 | −31 | | | 40.7 | |
| OBC 1 | 0.877 | −60 | | | | 39.3 |
| Calcium carbonate FilmLink 400 | 2.83 | — | 19.8 | 19.7 | 20.4 | 26.4 |
| Ampacet Blue Masterbatch | 0.87 | 221 | 0.9 | 1.1 | 1.1 | 1.0 |
| Total | | | 100 | 100 | 100 | 100 |
| Fraction of Polymer/ (Tackifier + Polymer) | | | 0.59 | 0.54 | 0.52 | 0.54 |

VERSIFY 2200, VERSIFY 2300 and DE2400.01 are P/E elastomers and plastomers available from The Dow Chemical Company. Escorez 5600 series tackifiers available from Exxon Mobil are very light colored aromatic modified cycloaliphatic hydrocarbon resins. Escorez 5637 was selected for its high softening point and its known compatibility with polyethylene polymers.

OBC1 is INFUSE 9100 olefin block copolymer available from The Dow Chemical Company and has a melt index of 1.0.

The retained load vs. time, recovery on retraction as measured via the stress-relaxation recovery method discussed above, stress vs. strain and hysteresis were measured for formulations A-D above. These were compared to a 3M Super 88 f-PVC tape. The results are shown in FIGS. 1, 2, 3 and 4 respectively. The results indicate that the formulations exhibit comparable or better performance to tapes made with materials such as f-PVC.

Figure 2:
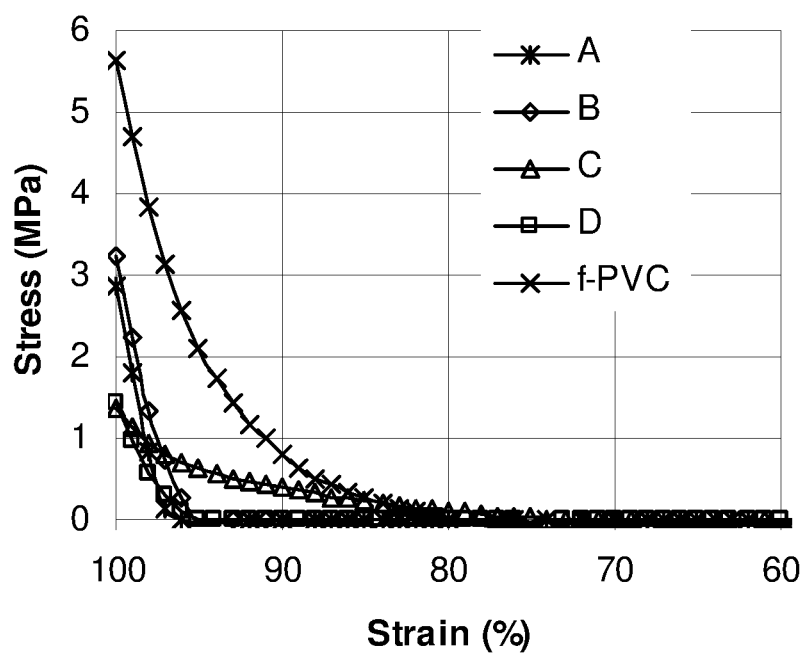
FIG. 2 shows recovery on removing the strain for f-PVC control and formulations A-D of Example 1.

Specifically FIG. 1 shows the normalized stress over 5 minutes for the incumbent f-PVC control (3M Super 88) on ambient conditions (about 21° C., 50% relative humidity) stretching the samples to 100% strain at 500%/min and monitoring the stress relaxation over the next 5 minutes. All four inventive formulations (A-D) show similar stress-relaxation characteristics to the control. The fraction of retained load at 5 minutes for the four formulations is 0.4 which is nearly identical to the f-PVC control. The crosshead is reversed to allow the film to retract and FIG. 2 shows the set. The higher the set, the lower the recovery and lower the tendency to debond. In contrast, neat polyethylene copolymers often have 65%, 35% and 20% set for the 9, 12 and 15 wt % ethylene content samples and usually show a retained load fraction close to 0.6.

Figure 3:
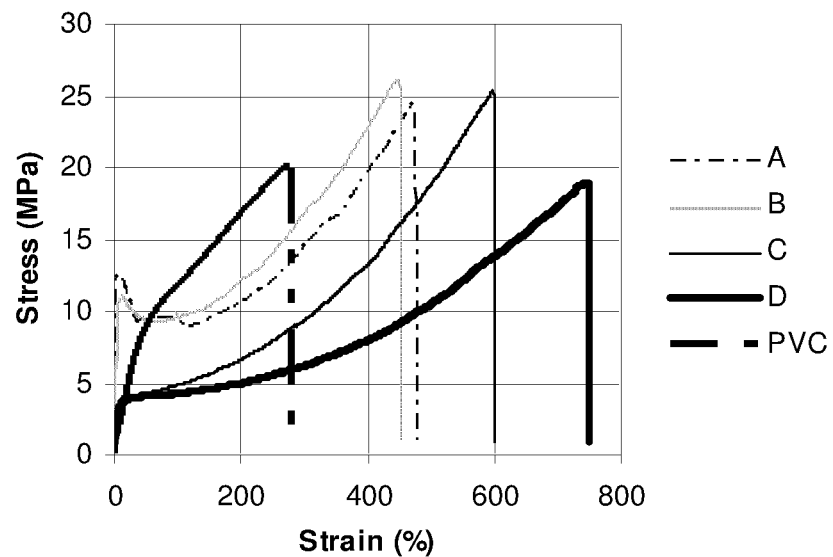
FIG. 3 shows stress-strain curve for inventive formulations A-D and f-PVC control of Example 1.
Figure 4:
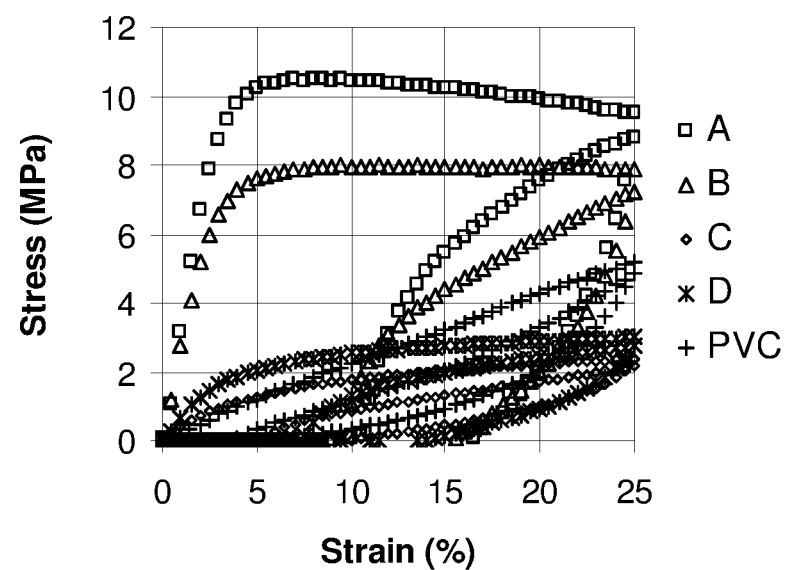
FIG. 4 shows 25% Hysteresis for f-PVC and for formulations A through D of Example 1.
Figure 5:
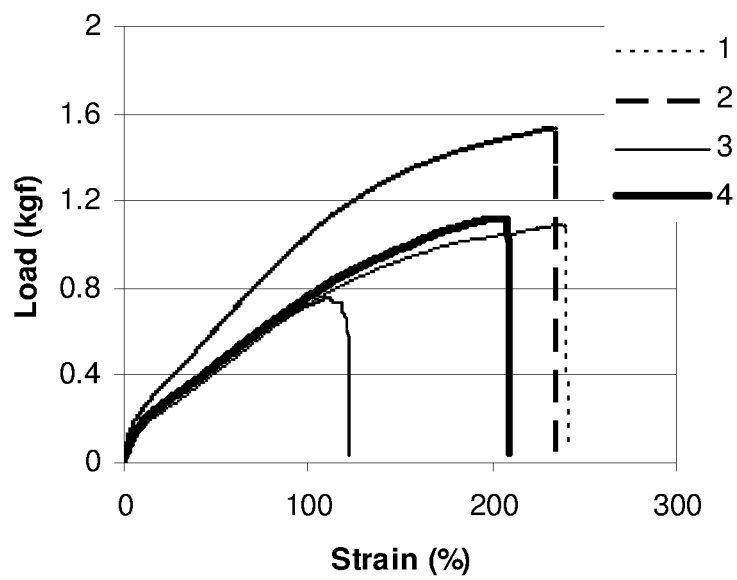
FIG. 5 shows stress-strain curve for inventive flame resistance formulations 1-4 of Example 2.
Figure 6:
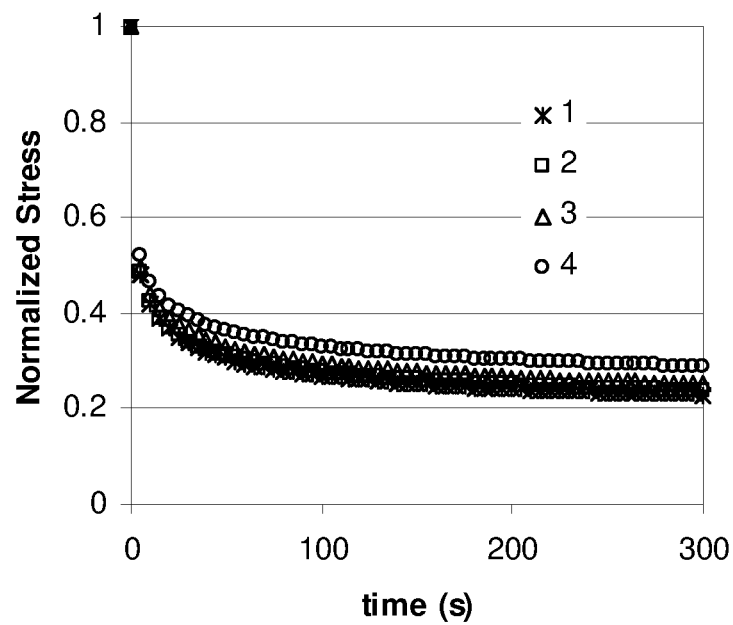
FIG. 6 shows retained load (fraction) over 5 minutes on applying 100% strain for formulations 1-4 of Example 2.
Figure 7:
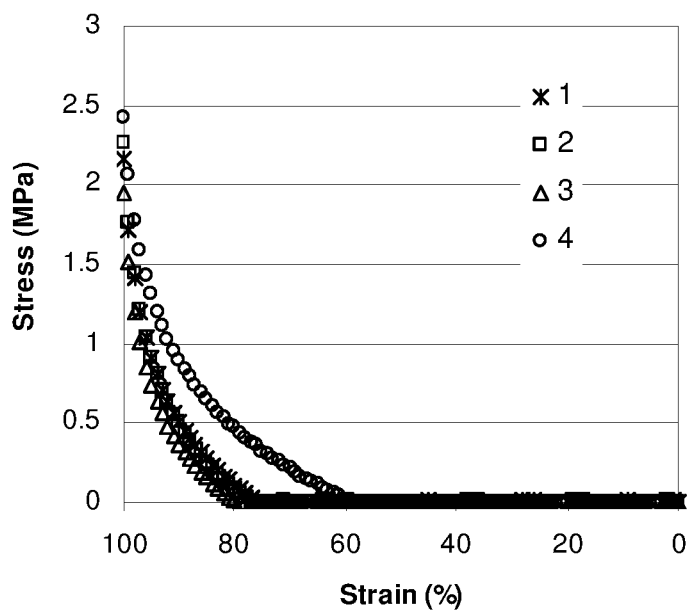
FIG. 7 shows recovery on removing the strain for formulations 1-4 of Example 2.
Figure 8:
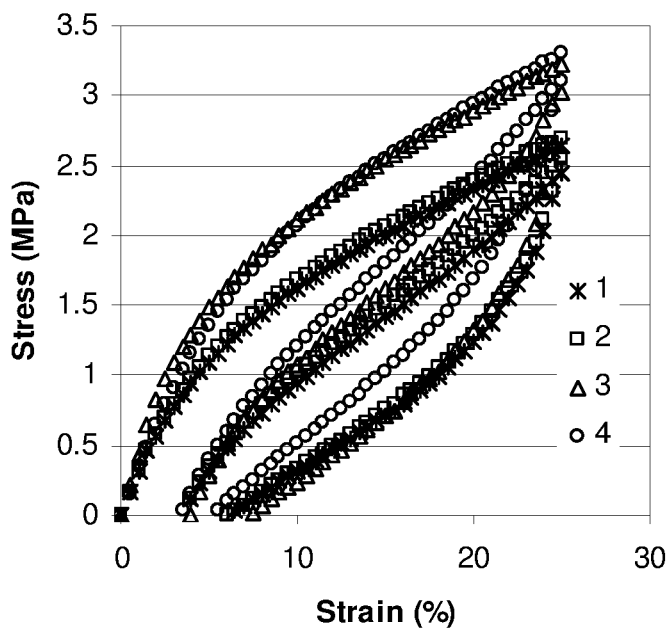
FIG. 8 shows 25% Hysteresis for formulations 1 through 4 of Example 2.

In addition, f-PVC films undergo affine deformation and do not show a necking and yielding behavior in their stress-strain curves. FIG. 3 shows that the formulations A and B that are based on DP 2200.01 and DE 2300.01 respectively have a yield point and undergo non-uniform deformation. Some applications that use f-PVC may be able to tolerate a yield point and additional information should be gathered when using formulations that show a yield point in the stress-strain curve. However, formulations based on OBC and DE 2400.01 do not exhibit a yield point and undergo uniform affine deformation, often a key performance criteria in some applications. Permanent set measures in the 25% Hysteresis test for f-PVC tapes is 4% whereas for formulations with DE 2400.01 and OBC it is 5-6%. This difference is within the typical uncertainty of the measurement and may be statistically insignificant. Unlike neat polyethylene copolymer resins that show nearly overlapping extension and retraction curves implying lower hysteresis and hence lower conformability, formulations of polyethylene copolymers and OBC with tackifier and filler advantageously show significant hysteresis similar to f-PVC based tapes.

Higher stress relaxation means that the polymer exhibits greater decrease in force over time. This is desirable in applications requiring greater comformability. Typical examples include but are not limited to signage, drapes, bandages, protective covers, pouches, intravenous liquid containing bags, floor covering, and tiles.

Example 2—Compositions Suitable for Ignition Resistance Applications

Formulations 1-4 are made by compounding the components in the weight percentages shown in the below table. A Banbury mixer is employed for the compounding. After compounding the formulations are pelletized using an under-water pelletizer and compression molded down to a thickness of 5-7 mil. The compression molder is set to 175° C., a pressure of 2000 psi for 3 minutes, followed by 50,000 psi for 8 minutes, and 50,000 psi @ 15° C. to cool for 1-2 minutes. Regions of this sheet with a consistent thickness of ~6 mil are used for physical testing.

TABLE 2

Formulations 1-4

|  | Density (g/cc) | 1 (wt. %) | 2 (wt. %) | 3 (wt. %) | 4 (wt. %) |
|---|---|---|---|---|---|
| OBC 1 | 0.877 | 16.45 | | 14.45 | 20.35 |
| OBC 2 | 0.877 | | 16.45 | | |
| Eastotac H100 R | 1.04 | 17.55 | 17.55 | 17.55 | 13.65 |
| Magnesium Hydroxide FR20S10 | 2.42 | 60.00 | 60.00 | 60.00 | 60.00 |
| Zinc stearate | 1.09 | 0.40 | 0.40 | 0.40 | 0.40 |
| Fusabond MN 493 | 0.87 | 5.00 | 5.00 | 5.00 | 5.00 |
| MB50-002 | 0.94 | | | 2.00 | |
| Irganox 1010 | 1.15 | 0.60 | 0.60 | 0.60 | 0.60 |
| Density of formulation | | 1.49 | 1.49 | 1.49 | 1.48 |

Fusabond MN493, is a ~1 wt % maleic anhydride grafted ethylene-octene copolymer from DuPont with a density of 0.87 g/cm³ and Melt Index of 1.0 g/10 min. Zinc Stearate is supplied by Alfa Aesar. MB50-002, supplied by Dow Corning, in pellet form comprises of 50% of an ultra-high molecular weight polydimethylsiloxane polymer dispersed in low-density polyethylene (PE). Eastotac* H100R from Eastman Chemicals is used as the tackifier. This resin is a partially hydrogenated aliphatic resin and is chosen for its compatibility to OBCs. Eastotac* H100R has a glass transition temperature of 44° C., a ring and ball softening temperature of 100° C., a density of 1.04 g/cc, M. 450 g/mol, and $M_w$ 1050 g/mol. OBC2 is INFUSE 9100 olefin block copolymer available from The Dow Chemical Company and has a 0.5 Melt Index.

The stress vs. strain curves, retained load fraction, recovery on retraction and hysteresis are measured for formulations 1-4 using similar method as above. The results are shown in FIGS. 5-8 respectively. The results indicate that the formulations 1 and 2 exhibit better stress relaxation, similar recovery and permanent set while having acceptable tensile strength and elongation for most applications disclosed.

Example 3—Compositions Suitable for Ignition Resistance Applications Comprising LDPE or Modified Olefin Multi-Block Interpolymer Formulations 5-10 are made by compounding the components in the weight percentages shown in the below table. A Banbury mixer is employed for the compounding. After compounding the formulations are pelletized using an under-water pelletizer.

TABLE 3

| | Density (g/cc) | Tg (K) | 5 | 6 | 7 | 8 | 9 | 10 |
|---|---|---|---|---|---|---|---|---|
| Eastotac H100 R | 1.04 | 317 | 15.05 | 15.05 | 15.05 | 15.05 | 14.3 | 17.55 |
| OBC 1 | 0.877 | 213 | 16.45 | 16.45 | | 16.45 | | |
| OBC 2 | 0.877 | 213 | | | 16.45 | | 16.45 | 13.95 |
| LDPE 662i | 0.919 | 242 | 2.5 | 2.5 | 2.5 | | 3.25 | 2.5 |
| Magnesium Hydroxide FR20S10 | 2.42 | — | 60 | 60 | 60 | 60 | 60 | 60 |
| Zinc stearate | 1.09 | — | 0.4 | 0.4 | 0.4 | 0.4 | 0.4 | 0.4 |
| Fusabond MN 493 | 0.87 | 221 | | 5 | | | | |
| Amplify GR216 | 0.87 | 221 | 5 | 0 | 5 | 5 | 5 | 5 |
| Irganox 1010 | 1.15 | — | 0.6 | 0.6 | 0.6 | 0.6 | 0.6 | 0.6 |
| 70/30 OBC/ PP 1500/1500 (rheology modified OBC) | 0.881 | 212 | | | | | 2.5 | |
| Density of formulation | | | 1.48 | 1.48 | 1.48 | 1.48 | 1.48 | 1.49 |

The rheology modified OBC sample is prepared by first blending a 0.5 MI OBC OBC 2 and a high melt strength random copolymer polypropylene DOW DS6D82 with 5.7 wt % ethylene and a MFR of 7 (2.16 kg, 230 C) in 70:30 ratio and then chemically modifying the blend using 1500 ppm of peroxide Trigonox 101 and 1500 ppm of coagent SR350. This rheology modified OBC is found to have a melt strength of 21 cN at 190° C.

AMPLIFY GR 216 is ~0.8 wt % maleic anhydride grafted ethylene-octene copolymer available from Dow with a density of 0.87 g/cm$^3$ and Melt Index of 1.0 g/10 min.

Figure 9:
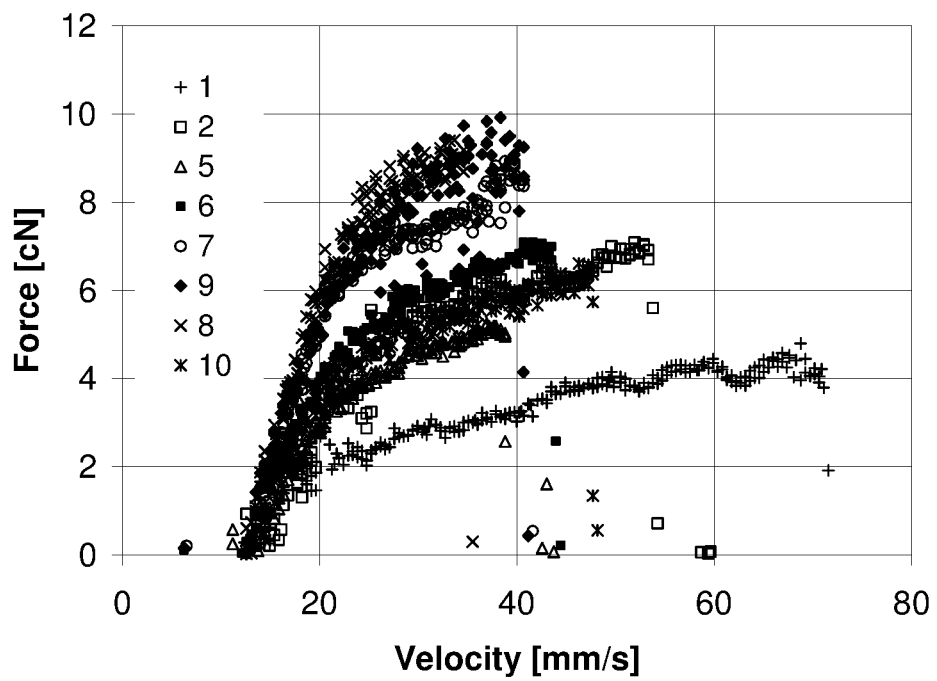
FIG. 9 compares the melt strength of formulations 1 and 2 of Example 2 and formulations 5-10 of Example 3.

All formulations 5-10 of Example 3 have similar stress-relaxation, tensile and hysteresis properties as formulation 1 of Example 2 described earlier. FIG. 9 compares the melt strength of formulations 1 and 2 of Example 2 and formulations 5-10. As compared to formulation 1 of Example 2 with OBC 1 that has a melt strength of 4 cN, formulation 5, 6 and 8 with LDPE/rheology modified OBC compounds yield melt strength values of 5 cN, 7 cN, and 9 cN, respectively. Formulations 7 and 9 demonstrate melt strength values of 9 cN and 10 cN, respectively, as compared to formulation 2 of Example 2 with OBC 2 that has a melt strength of 7 cN. Based on the 1.7× improvement in melt strength of formulation 6 versus formulation 1 of Example 2 and the ~1.5× improvement in formulation 9 versus formulation 2 of Example 2, Formulation 6 and 9 are expected to be better for applications that require higher melt strengths. These results indicate that further melt strength improvements can be made if needed by addition of more LDPE and/or modified olefin multiblock interpolymer.

Example 4—Flame Performance

The flame performance of Formulations 1, 3, and 4 of Example 2 and Formulations 5, 7, 9, and 10 of Example 3 is measured using a cone calorimeter. The cone calorimeter is one of the commonly used types of fire testing equipment which provides quantitative data for the flammability of a material under constant external heat flux. The flammability is measured by the heat release rate (HRR). As HRR increases, flame spread and flashover increase. Time to ignition, extinguishment time, total heat release, $CO/CO_2$ production, and smoke release are some of the critical data that can be collected from a single cone calorimeter test. A Fire Testing Technology (FTT) Cone calorimeter at a heat flux of 35 kW/m$^2$ is used to test flammability of plaques that were compression molded to a thickness of 0.125" and measuring 10 cm by 10 cm. In this study, no duplicate or triplicate measurements are done. Single burn data are obtained for each sample for comparison purposes. Once the material ignites, the time it takes to reach the peak heat release ($t_{peak}$) is a good indicator for comparing samples in terms of burning rate. In this case, the sample with the least amount of tackifier formulation 4 shows the longest time to peak heat release rate. The sample also burns the longest before extinguishment. Addition of the silicone masterbatch in formulation 3 has a minimal effect on the flammability characteristics. A comparison of formulation 1 with formulations 5, 7, and 9 indicates that the presence of the LDPE in the latter formulations seems to slightly reduce the peak heat release rate by stabilizing the char structure. This is evident by the extinguishment times for these samples as compared to the control 1 formulation. The table below lists the time to ignition, time to peak heat release, time for extinguishment, and the peak heat release rate. Advantageously, these results are comparable to non-halogen flame retardant formulations based on polyolefins, known to those skilled in the art.

TABLE 4

| | t(ignition) (sec) | t(end) (sec) | Tpeak (sec) | Heat Release Rate (peak) (kW/m2) |
|---|---|---|---|---|
| Formulation 1 | 46 | 271 | 100 | 318 |
| Formulation 3 | 50 | 197 | 90 | 284 |
| Formulation 4 | 69 | 419 | 130 | 306 |
| Formulation 5 | 38 | 196 | 80 | 299 |
| Formulation 7 | 37 | 186 | 76 | 296 |
| Formulation 9 | 42 | 188 | 82 | 288 |
| Formulation 10 | 35 | 200 | 70 | 298 |

Example 5—Varying Level of Tackifier

Formulations are made by compounding the components in the weight percentages shown in the below table. A small 250 g Haake Bowl is employed for the compounding.

TABLE 5

Formulations 11-15

| | Density (g/cc) | 11 | 12 | 13 | 14 | 15 |
|---|---|---|---|---|---|---|
| Eastotac H100 R | 1.04 | 11.00 | 8.00 | 6.00 | 22.00 | 15.05 |
| OBC1 | 0.877 | 19.32 | 21.84 | 23.52 | 10.08 | 16.45 |
| OBC2 | 0.877 | 0.00 | 0.00 | 0.00 | 0.00 | 0.00 |
| LDPE 662i | 0.919 | 3.68 | 4.16 | 4.48 | 1.92 | 2.5 |
| Magnesium Hydroxide FR20S10 | 2.36 | 60.00 | 60.00 | 60.00 | 60 | 60 |
| Zinc stearate | 1.09 | 0.40 | 0.40 | 0.40 | 0.4 | 0.4 |

TABLE 5-continued

Formulations 11-15

| | Density (g/cc) | 11 | 12 | 13 | 14 | 15 |
|---|---|---|---|---|---|---|
| Fusabond MN 493 | 0.87 | 5.00 | 5.00 | 5.00 | 5 | 5 |
| Irganox 1010 | 1.15 | 0.60 | 0.60 | 0.60 | 0.6 | 0.6 |
| Tackifier: Total Polymer | wt/wt | 0.5 | 0.3 | 0.2 | 1.8 | 0.8 |
| Density of formulation | | 1.46 | 1.45 | 1.44 | 1.50 | 1.47 |

Figure 10:
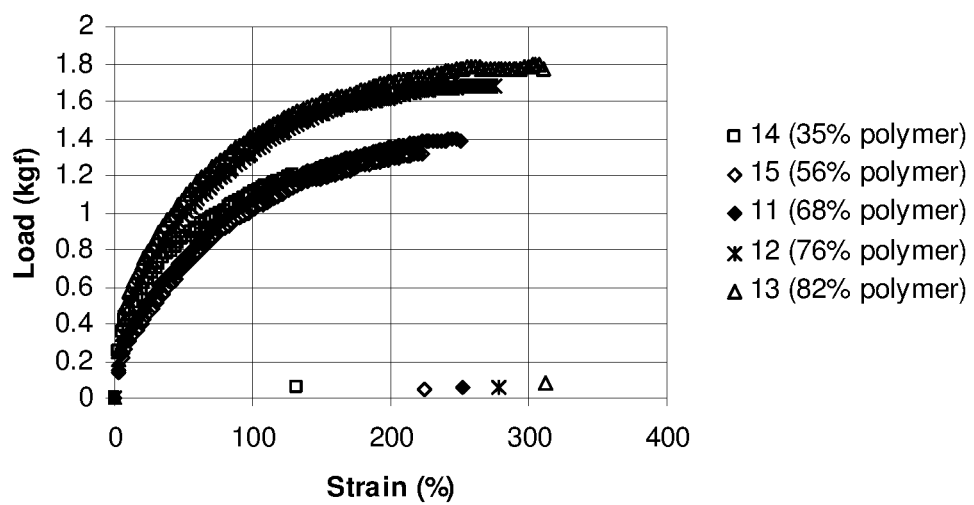
FIG. 10 shows stress-strain curve for flame resistance formulations of Example 5.
Figure 11:
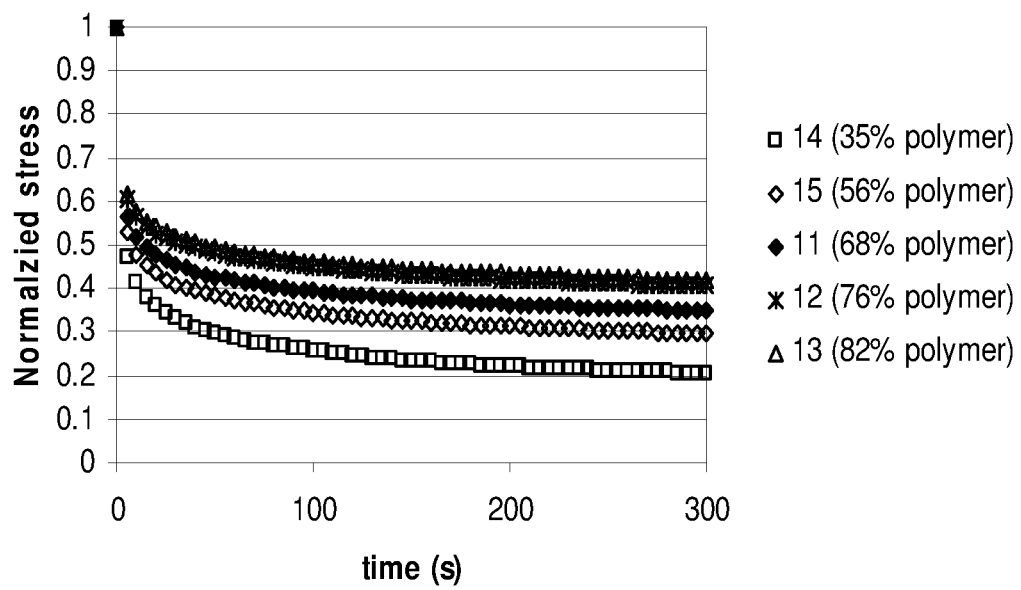
FIG. 11 shows recovery on removing the strain for formulations of Example 5.
Figure 12:
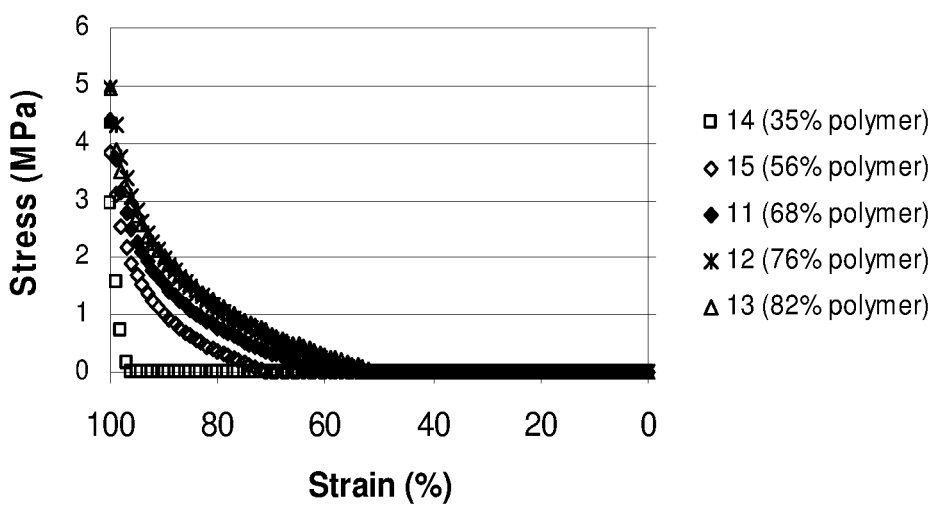
FIG. 12 shows recovery on removing the strain for formulations of Example 5.

The load vs. strain and normalized stress vs. time and recovery on retraction are measured for formulations 11-15 above. The results are shown in FIGS. 10-12. The results indicate surprising and unexpected properties for a ratio of polymer to tackifier of from about 50 to about 70%.

Figure 13:
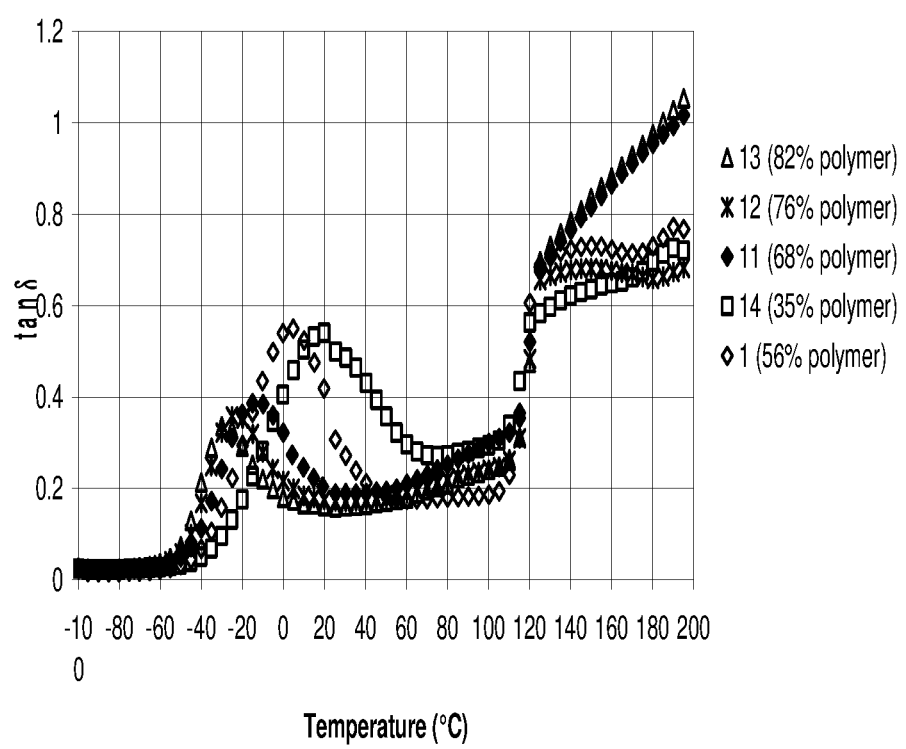
FIG. 13 shows tan δ vs. temperature for formulations of Example 5 that vary the amount of tackifier.

For formulations 11 to 15, the ratio of LDPE to OBC 2 is kept nearly constant as is the filler content, but the amount of tackifier is varied to determine the influence of the amount of tackifier on the physical properties. The weight fraction of (OBC+LDPE)/(OBC+LDPE+tackifier) is reported as percentage of polymer in the legend of FIG. 13. FIG. 13 shows tan δ as a function of temperature for formulations 11 through 14 as compared to the control formulation 1. The sample with the least % of polymer (formulation 14) tends to shift the glass transition temperature closest to room temperature or more f-PVC like behavior.

Example 6

Using raw materials (Table 6), compositions (Table 7) were made. Corresponding mechanical properties are shown (Table 8). Of note was the choice of a surface treated filler (Filmlink 400 available from Imerys Performance Minerals), a calcium carbonate. As can be seen, the inventive formulations were able to achieve high stress relaxation performance equal to or higher than comparative sample L*(a f-PVC film from a commercially available f-PVC based bandage marketed under the Band-Aid tradename by Johnson & Johnson Corporation). Though not limited by theory, it is thought that the selection of a surface treated filler enables debonding which produced a breathable structure upon stretching due to formation of microvoids. Such a structure is thought to be advantageous for wound care applications to manage moisture for the benefit of improved skin health.

TABLE 6

Components

| Components: | Designation | Density (g/cm$^3$) | Ethylene (wt. %) | Crystallinity (wt. %) | MFR or MI (g/10 min) | Tg (° C.) |
|---|---|---|---|---|---|---|
| Regalite R1100 | T1 | 0.99 | n/a | — | n/a | 50* |
| Regalite R1125 | T2 | 0.98 | n/a | — | n/a | 73* |
| PBEP | P/E-1 | 0.866 | 15 | 7.3 | 2$^a$ | −18 |
| INFUSE 9530 OBC | OBC3 | 0.887 | — | 24.9 | 5$^b$ | −50 |
| INFUSE 9507 OBC | OBC4 | 0.866 | — | 8.8 | 5$^b$ | −60 |

$^a$denotes melt flow rate measured at 230° C. and 2.16 kg for polypropylene (ASTM D 1238-00)
$^b$denotes melt index measured at 190° C. and 2.16 kg for polyethylene (ASTM D 1238-00)
'n/a' denotes not available

TABLE 7

Formulations

| Formulation | T1 (wt. %) | T2 (wt. %) | P/E-1 (wt. %) | OBC3 (wt. %) | OBC4 (wt. %) | CaCO$_3$* (wt. %) |
|---|---|---|---|---|---|---|
| 27 | 25 | | 75 | | | |
| 28 | 25 | | | 75 | | |
| 29 | 25 | | | | 75 | |
| 30 | | 25 | 75 | | | |
| 31 | | 25 | | 75 | | |
| 32 | | 25 | | | 75 | |
| 33 | 12.5 | | 37.5 | | | 50 |
| 34 | 12.5 | | | 37.5 | | 50 |
| 35 | 12.5 | | | | 37.5 | 50 |
| 36 | | 12.5 | 37.5 | | | 50 |
| 37 | | 12.5 | | 37.5 | | 50 |
| 38 | | 12.5 | | | 37.5 | 50 |

'*'denotes calcium carbonate Filmlink 400 available from Imerys Corporation (Roswell, GA, USA)

TABLE 8

Mechanical Properties

| | | *L | 27 | 28 | 29 | 30 | 31 | 32 | 33 | 34 | 35 | 36 | 37 | 38 |
|---|---|---|---|---|---|---|---|---|---|---|---|---|---|---|
| Tensile | 2% Sec Mod (MPa): | 51 | 4.3 | 22 | 6 | 4.4 | 28 | 7.2 | 60 | 98 | 38 | 82 | 144 | 47 |
| | Stdev | — | 0.5 | 2 | 0.9 | 0.6 | 1 | 0.8 | 4 | 9 | 0.5 | 4 | 4 | 9 |
| | Elongation at Break (%): | 246 | 1210 | 1222 | 2500 | 1280 | 1055 | 2020 | 1400 | 609 | 2200 | 25 | 274 | 1000 |
| | Stdev | — | 40 | 40 | 100 | 20 | 9 | 20 | 40 | 70 | 200 | 1 | 4 | 100 |
| | Tensile Strength MPa | 18.6 | 6.6 | 13 | 5.2 | 9 | 14 | 6 | 2.5 | 5.6 | 2.4 | 2.1 | 6.4 | 3.8 |
| | Stdev | | 0.5 | 1 | 0.3 | 0.3 | 0.5 | 0.1 | 0 | 0.4 | 0.3 | 0.1 | 0.1 | 0.1 |
| 25% Hyst | Set (%): | 4 | 3.1 | 3.9 | 3.3 | 3.03 | 4.15 | 3.5 | 6.1 | 6.5 | 4.7 | 6.7 | 5.8 | 5.3 |
| | Stdev | 0.01 | 0.1 | 0.1 | 0.3 | 0.02 | 0.02 | 0.1 | 0.3 | — | 0.3 | 0.3 | 0.3 | 0.3 |
| Stress-Relaxation (Condition B, Ambient) | Stress @ 100%, 0 min (MPa): | 11.39 | 0.94 | 2.5 | 0.77 | 1.04 | 3 | 0.87 | 1.2 | 4.5 | 1.4 | 1.6 | 6.29 | 3.1 |
| | Stdev | 0.02 | 0.02 | 0.8 | 0.01 | 0.03 | 0.1 | 0.01 | 0.1 | 0.1 | 0.1 | 0.1 | 0.04 | 0.2 |
| | Stress @ 100%, 5 min (MPa) | 3.53 | 0.59 | 1.68 | 0.548 | 0.66 | 1.9 | 0.61 | 0.37 | 1.8 | 0.51 | 0.46 | 2.66 | 0.9 |
| | Stdev | 0.031 | 0.01 | 0.02 | 0.007 | 0.01 | 0.1 | 0.01 | 0.04 | 0.1 | 0.03 | 0.01 | 0.01 | 0.1 |
| | Stress-Relaxation (%): | 69 | 37 | 32 | 28.6 | 36 | 37 | 31 | 69 | 61 | 63 | 72 | 57.8 | 69 |
| | Stdev | 0.6 | 1 | 10 | 0.5 | 1 | 2 | 1 | 8 | 4 | 4 | 4 | 0.5 | 6 |

We claim:

1. A composition suitable for a fabricated article comprising:
   (1) a polymer selected from the group consisting of:
      (A) an ethylene/α-olefin multiblock interpolymer;
      (B) a propylene based plastomer or elastomer; and
      (C) a mixture of (A) and (B);
   (2) from 1 to 75 weight percent filler based on the weight of the composition;
   (3) an effective amount of at least one tackifier; and
   (4) a curable composition for forming a rheology modified ethylene/α-olefin multiblock interpolymer, wherein the curable composition comprises an ethylene/α-olefin multiblock interpolymer having a melt index of 0.5 g/10 minutes (ASTM D1238 at 190° C., 2.16 kg), a random copolymer polypropylene having a melt flow rate of 7 g/10 minutes (ASTM D1238 at 230° C., 2.16 kg), an organic peroxide, and a co-agent.

2. The composition of claim 1, wherein the polymer is an ethylene/α-olefin multiblock interpolymer which is characterized by a Mw/Mn from 1.7 to 3.5, at least one melting point, Tm, in degrees Celsius, and a density, d, in grams/cubic centimeter, wherein the numerical values of Tm and d correspond to the relationship:

$T_m > -6553.3 + 13735(d) - 7051.7(d)^2$.

3. The composition of claim 1, wherein each of the ethylene/α-olefin multiblock interpolymer and the ethylene/α-olefin multiblock interpolymer having a melt index of 0.5 g/10 minutes (ASTM D1238 at 190° C., 2.16 kg) is an ethylene-octene interpolymer comprising at least 50 mole percent ethylene.

4. The composition of claim 1, wherein the weight ratio of tackifier to polymer is from 0.1 to 4.

5. The composition of claim 1, wherein the filler comprises from 40 to 75 weight percent of the composition based on the total weight of the composition.

6. The composition of claim 1, wherein the tackifier has a Ring and Ball Softening Point of from 100 to 160° C.

7. The composition of claim 1, wherein the tackifier has a glass transition temperature of from 40 to 95° C.

8. The composition of claim 1, wherein the tackifier has a density of from 0.5 to 1.5 g/cm³.

* * * * *